H. HUNGERFORD.
APPARATUS FOR STIRRING AND MIXING SOAP, &c.
No. 38,167. Patented Apr. 14, 1863.
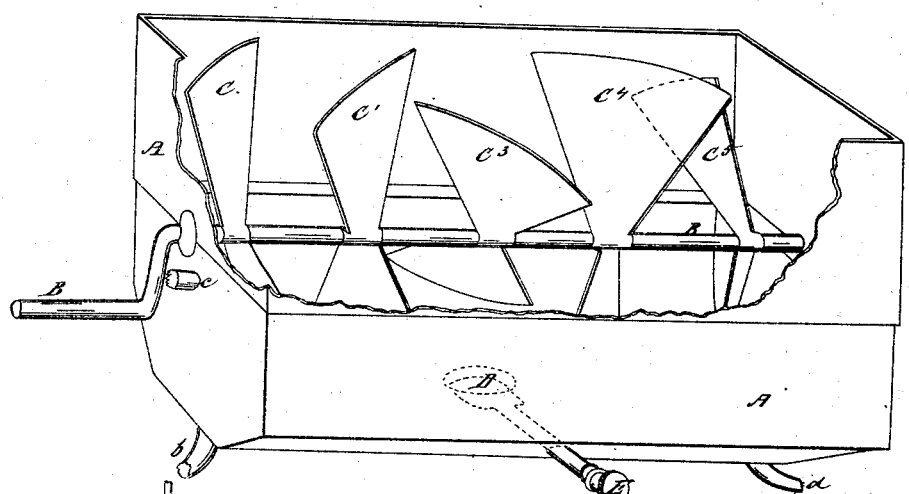
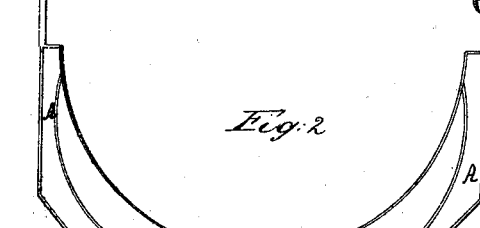
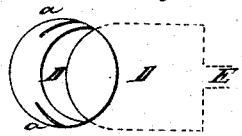
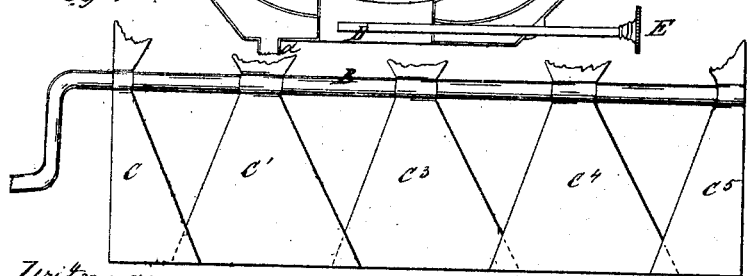
Witnesses:
Inventor
Henry Hungerford

UNITED STATES PATENT OFFICE.

HENRY HUNGERFORD, OF NEW YORK, N. Y.

IMPROVEMENT IN APPARATUS FOR STIRRING AND MIXING SOAPS, COLORS, &c.

Specification forming part of Letters Patent No. 38,167, dated April 14, 1863.

*To all whom it may concern:*

Be it known that I, HENRY HUNGERFORD, of the city and State of New York, have invented a new and useful and Improved Kettle and Apparatus for Mixing Soaps, Colors, and other Substances; and I do hereby declare that the following is a full, clear, and exact description thereof, and of its construction and mode or manner of operation, reference being had to the accompanying drawings, and to the letters of reference marked thereon, making a part of this specification.

Figure 1 is a general perspective view of the kettle and apparatus. Fig. 2 is a cross-section of Fig. 1 through the middle. Fig. 3 is a detached view of the valve or discharge opening. Fig. 4 is a view of the shaft, showing the relative sizes of the arms or mixers and their lap.

In the manufacture of soaps, colors, and many other substances composed of different ingredients, and which require to be thoroughly mixed and incorporated together, the process of mixing and incorporating the ingredients together has heretofore generally been performed by hand-power, and is a laborious and oftentimes a difficult operation.

My invention consists in the production of a kettle or vessel in itself adapted for the purpose, and of a mixing or stirring apparatus by which the process of mixing the ingredients of any article can be much easier performed, and at the same time be much more completely and perfectly done, and to which steam or other power can be applied, and thus the operation be carried on on a larger scale, and with a great saving of expense in the manufacture. In the manufacture of articles, also, in which the ingredients used have different specific gravities there is a natural tendency of those which are the heaviest to settle toward and to the lowest parts of the vessel, and for this reason a complete and uniform mixture and incorporation of such ingredients is difficult to be effected. By my invention, however, the mixture of ingredients of varying specific gravities may be effected in the most complete manner and with great uniformity.

The vessel A is made double, as shown in Fig. 2, so that the inside vessel and anything in it can be quickly and uniformly heated by the admission of steam or heated water between the two vessels. The shape of the vessel A is also such as to give a great extent of surface, so that different temperatures can be easily produced, it being necessary in some manufactures to vary and sometimes comparatively suddenly the temperature of the article. The form of the vessel is also favorable to an easier and more complete mixing and incorporation of the several ingredients composing any article. Through the vessel A passes a shaft, B, to which are fixed the arms or stirrers C C' C², &c. The lower part of the vessel is semicircular, but the upper part need not correspond in shape with it, but may have straight sides, as represented in Fig. 1. The distance from the shaft B to the top of the vessel should, however, be greater than that between the shaft and the bottom, so as to prevent the mixture from being thrown over the sides. Such shaft may be worked by steam or other power, or by a crank by hand-power, according to the size of the vessel A or the quantity of the article to be mixed. The arms or stirrers C C' C², &c., are of such a length as just to revolve in the vessel A and almost touch the sides, so as to move without actually coming in contact with the sides of the vessel, but so as to prevent any portion of the article being mixed from remaining unmixed or from adhering to the vessel and being burned, and so that any of the ingredients settling to the bottom shall be at once thrown upward and kept in motion. The arms or stirrers C C⁵, at either end of the vessel A, are also shaped, as shown more plainly in Fig. 4, so as to revolve close to the ends of such vessel and keep the ingredients in those parts of the vessel continually in motion. In order, also, to insure a more complete movement of the article to be mixed, I make the breadth of the several stirrers at their ends such, as shown in Fig. 4, that each one in its revolution shall sweep over a little part of the surface of the vessel swept by the contiguous arms. The arms or stirrers C C⁵ and those, C' C⁴, next to them, are placed on an angle—say about forty-five degrees—with the plane of the shaft B, such that as these arms enter and pass through the material their action is to constantly throw such material toward the center of the vessel A, and away from the ends. The center arms, on the other hand, are placed at a reversed angle or inclination, so as to carry or throw the material away from the center and toward the ends of the vessel. By placing these arms on an angle they have also the effect, as they pass through the kettle, to lift and carry upward any of the heavier ingredients, and thus keep them in motion until they are thoroughly incorporated with the other ingredients. The action of such arms or stirrers upon the material in the vessel A is thus threefold—upward from the bottom of the vessel toward the top, from the ends toward the center, and again from the center toward the ends—and the result is a complete mingling and incorporation of all the several ingredients, and the article produced is more uniform in character, and consequently of a better quality, than can be obtained when the incorporation is less perfect. By such an arrangement of stirrers the labor, even when the shaft is worked by hand power, is far less than when the mixing is effected by any of the usual methods. As soaps, colors, and similar manufactures are now mixed, it is by means of an instrument called a "crutch" or "stirrer," with a long handle, which is pushed into the kettle or tub, and then the outer end borne down and at the same time raised, so as to mix the general mass, and this is done by manual labor. The operation is slow and laborious, and at best effects but an imperfect mingling of the several ingredients, and does not and cannot lift the heavier ingredients or prevent the mass from remaining in contact with the surface of the vessel, so as to be in danger of being burned or more or less injured or imperfectly mixed. The arms, instead of being attached to the shaft in pairs, may be attached singly and in such a manner that some of them will be constantly entering the mass to be mixed, and such arms may also be so made or fixed to the shaft that their inclination or angle with the plane of the shaft may be varied, in order to give a greater or less motion of the article being mixed toward and away from the center of the vessel. The general arrangement of the arms will, however, be such that those on either side of the center of the vessel A will move the article being mixed away from the ends of the kettle, while the central arms will give it a contrary motion. The proportions of the arms may also be varied, if desired. That arrangement of causing each arm to sweep over some part of the vessel A swept by the contiguous arms is 1 ct, however, absolutely essential, though it tends to the better mingling of the ingredients.

The arrangement of the several arms so that their ends will just clear the sides of the kettle, and so that they will give a lifting motion to the article, and also a movement toward and away from the center of the vessel, or a simple lateral movement, may be applied to vessels of circular and other shapes.

In the bottom of the vessel A is an opening and valve, D, through which the contents, when properly mixed and ready, can be readily discharged into molds or any receptacle. The valve shuts or moves air or steam tight, and, as it must bear more or less weight or pressure, it moves in a groove, $a$, made in the box in which the valve rests. The valve is worked by means of the rod E. No particular form or arrangement of valve is necessary, but it should work nicely and tightly.

Steam is admitted to the space between the two vessels A by one of the pipes $b$ or $c$, and any required degree of heat may thus be easily obtained. Hot water may also be used in place of steam. Cold water may be admitted through the other pipe, so as to reduce or qualify the temperature, as may be required.

In the preparation of many articles great attention has to be given to the temperature at different stages of the process of manufacture, which, however, can scarcely be produced in the use of the ordinary mixing-kettles.

The form of my kettle, in affording a large extent of surface, renders it comparatively easy to produce all such desired changes, and thus secures the production of a better article of manufacture. The pipe $d$ is a discharge-pipe to draw off anything between the double vessel A. The valve is to be placed as near the bottom of the kettle as possible, so as to allow the ingredients to settle as little as may be in the cavity formed by the necessary depression of the valve. Stop-cocks may also be placed in the sides of the kettle, if desired, to be used for drawing off the lighter portions, as is desirable in the manufacture of colors.

In the manufacture of articles not requiring heat, the vessel A may be made single, and not double, as represented.

Different forms and arrangement of arms from that before described may be made use of, and which will give the same motions and results, as a revolving drum may be placed in the vessel having some of its arms horizontal, like the ordinary buckets in a water-wheel, and others at an angle, so as to give motion to the material toward and away from the center and the ends.

Other modifications of form will readily suggest themselves to a mechanic, and in some cases, where so energetic movement is not desired, part of the arms may be dispensed with.

The vessel A may also be made the lowest in the center and elliptical in shape, the arms being made to conform to such shape of the vessel. Such variation in the form of the kettle may perhaps be made the subject of another application for a patent.

What I claim as my invention, and desire to secure by Letters Patent, is—

1. The form and construction of the vessel A for mixing soaps, colors, and substances made up of different ingredients, substantially as and for the purposes set forth.

2. The arrangement, substantially as described, of the arms C C', &c., on the shaft B, or their equivalent, so as to give a lifting or upward and at the same time a lateral motion to the article being mixed, substantially as and for the purposes set forth.

3. The combination of the shaft B with its arms C, or their equivalent, with the mixing-vessel A, or with a mixing-vessel of other shape, for the purposes set forth.

4. The application of the valve D, in combination with a mixing-kettle, A, substantially as and for the purposes set forth.

HENRY HUNGERFORD.

Witnesses:
 FRA. L. HOLBROOK,
 S. D. LAW.